(12) United States Patent
Kuwajima et al.

(10) Patent No.: US 7,813,123 B2
(45) Date of Patent: Oct. 12, 2010

(54) OPENING AND CLOSING DEVICE

(75) Inventors: Hideki Kuwajima, Kyoto (JP); Yasuchika Kudo, Fukui (JP)

(73) Assignee: Panasonic Corporation, Osaka (JP)

( * ) Notice: Subject to any disclaimer, the term of this patent is extended or adjusted under 35 U.S.C. 154(b) by 154 days.

(21) Appl. No.: 12/025,108

(22) Filed: Feb. 4, 2008

(65) Prior Publication Data
US 2008/0232070 A1 Sep. 25, 2008

(30) Foreign Application Priority Data
Mar. 22, 2007 (JP) ............................. 2007-074183

(51) Int. Cl.
*H05K 5/00* (2006.01)
*H05K 7/00* (2006.01)
(52) U.S. Cl. .............................. 361/679.56; 361/679.3; 455/575.1; 455/575.4
(58) Field of Classification Search ............. 361/679.3, 361/679.56; 455/575.1, 575.4
See application file for complete search history.

(56) References Cited
U.S. PATENT DOCUMENTS
7,286,862 B2 * 10/2007 Lee et al. .................. 455/575.4

| | | | |
|---|---|---|---|
| 7,395,102 B2 * | 7/2008 | Park et al. ................ | 455/575.4 |
| 7,564,691 B2 * | 7/2009 | Kuwajima et al. ......... | 361/728 |
| 7,564,967 B2 * | 7/2009 | Pan ........................ | 379/433.12 |
| 2006/0226150 A1 | 10/2006 | Pan | |
| 2007/0032278 A1 * | 2/2007 | Lee et al. ................. | 455/575.4 |
| 2008/0076493 A1 * | 3/2008 | Seo et al. ................. | 455/575.4 |

FOREIGN PATENT DOCUMENTS
CN 100412389 C 12/2006
JP 2006-66526 A 3/2006

* cited by examiner

*Primary Examiner*—Jayprakash N Gandhi
*Assistant Examiner*—Anthony M Haughton
(74) *Attorney, Agent, or Firm*—RatnerPrestia

(57) ABSTRACT

An opening and closing device in which a movable gear is movably disposed on a fixed plate, and a fixed gear engaged with the movable gear is secured to a right end of a spring member applying a force to a movable plate in a moving direction. This right end of the spring member is installed in an L-shaped guide hole and a left end of the spring member is attached to the movable plate. With this structure, the opening and closing device offers combined operations in an up-and-down direction and a right-and-left direction orthogonal to the up-and-down direction.

1 Claim, 10 Drawing Sheets

OPENING AND CLOSING DEVICE

BACKGROUND OF THE INVENTION

1. Field of the Invention

The present invention relates to opening and closing devices used in a range of electronic devices such as mobile phones and personal computers.

2. Background Art

With electronic devices such as mobile phones and personal computers becoming increasingly more diversified and sophisticated, many products are adopting designs that open and close a movable housing relative to a fixed housing so as to provide diversifying operations. Accordingly, more inexpensive and user-friendly opening and closing devices that allow diversifying operations are demanded for the use in these products.

FIGS. 10A, 10B, and 10C are perspective views of a conventional mobile phone. As shown in FIG. 10C, operating part 2 including operation keys 2A and input keys 2B for inputting numbers and characters, and sound input part 3 such as a microphone are formed on the top face of fixed housing 1. Middle housing 4 is placed on the top face of fixed housing 1. Movable housing 5 is placed on the top face of middle housing 4. Display 6 such as a liquid crystal display element and sound output part 7 such as a speaker are formed on movable housing 5.

Middle housing 4 is disposed on fixed housing 1 in a left-to-right movable manner, and movable housing 5 is disposed on middle housing 4 in an up-and-down movable manner. In addition, opening and closing device 8 is disposed between fixed housing 1 and middle housing 4 in an openable and closable manner in a right-and-left direction. Opening and closing device 9 is disposed between middle housing 4 and movable housing 5 in an openable and closable manner in an up-and-down direction.

In the above structure, a user can watch a TV program received on display 6 or confirm a caller indicated on display 6 when receiving a call in a state that movable housing 5 is overlaid on fixed housing 1, as shown in FIG. 10A, that is a closed state. When movable housing 5 is moved upward by hand from this closed state, a force to open upward is applied to movable housing 5 by opening and closing device 9 disposed between middle housing 4 and movable housing 5. As a result, as shown in FIG. 10B, movable housing 5 is retained in a state opened upward relative to fixed housing 1 so that sound input part 3 and input keys 2B are uncovered, allowing comfortable telephone conversation through sound input part 3 and sound output part 7.

When movable housing 5 is moved rightward from the closed state, a force to open movable housing 5 rightward is applied by opening and closing device 8 disposed between fixed housing 1 and middle housing 4. As a result, as shown in FIG. 10C, movable housing 5 is retained in a state opened rightward relative to fixed housing 1 so that operating part 2 including operation keys 2A and input keys 2B is uncovered. This facilitates input of characters and numbers to a mail or function setting by using operating part 2 while looking at display 6. Prior arts related to the present invention include Japanese Patent Unexamined Publication No. 2006-66526.

However, an electronic device equipped with the conventional opening and closing device requires middle housing 4 between fixed housing 1 and movable housing 5, and two opening and closing devices 8 and 9 between three housings. Accordingly, a large number of components lead to a complicated structure, resulting in time-consuming product processes for attachment and assembly.

SUMMARY OF THE INVENTION

The present invention offers an opening and closing device with a simple structure that allows diversifying operations.

In the opening and closing device of the present invention, a movable gear is movably or rotatably attached to a fixed plate or a movable plate movably disposed on a top face of the fixed plate. A fixed gear engaged with the movable gear is secured to one end of a spring member applying a force to the movable plate in a moving direction. This one end of the spring member is installed in an L-shaped guide hole provided on the movable plate, and another end of the spring member is attached to the movable plate. This simple structure achieves combined operations in an up-and-down direction and a right-and-left direction orthogonal to the up-and-down direction. The present invention thus offers the opening and closing device that allows diversifying operations.

Furthermore, the opening and closing device of the present invention includes multiple spring members and multiple guide holes. This prevents wobbling of the movable plate while moving the movable plate in the up-and-down direction and the right-and-left direction, ensuring reliable operations.

DETAILED DESCRIPTION OF THE INVENTION

First Exemplary Embodiment

Figure 1:
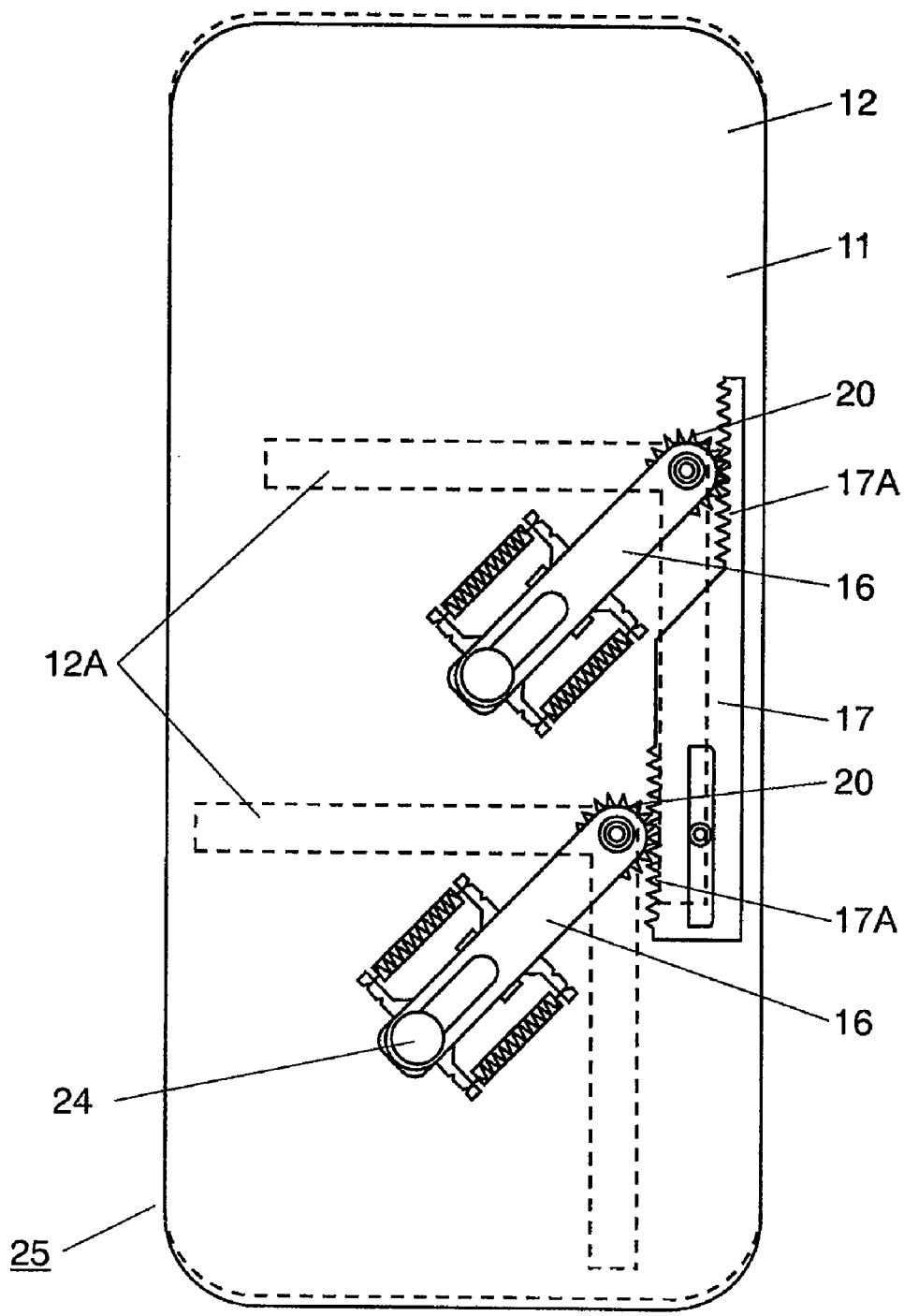
FIG. 1 is a plan view of an opening and closing device in accordance with a first exemplary embodiment of the present invention.
Figure 2:
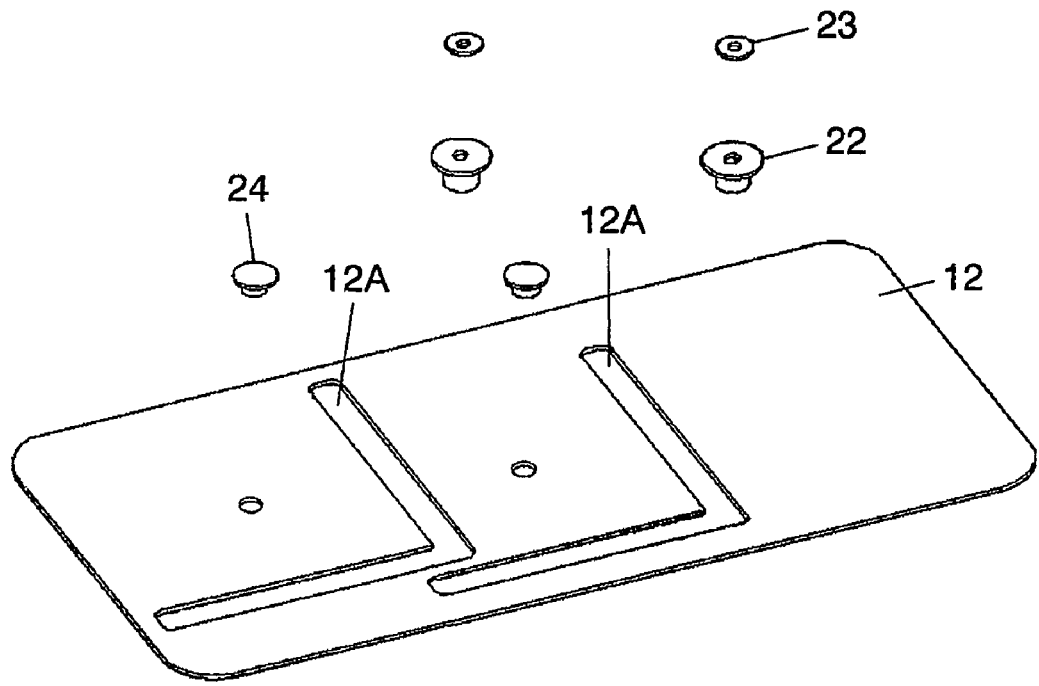
FIG. 2 is an exploded perspective view of the opening and closing device in accordance with the first exemplary embodiment of the present invention.
Figure 2:
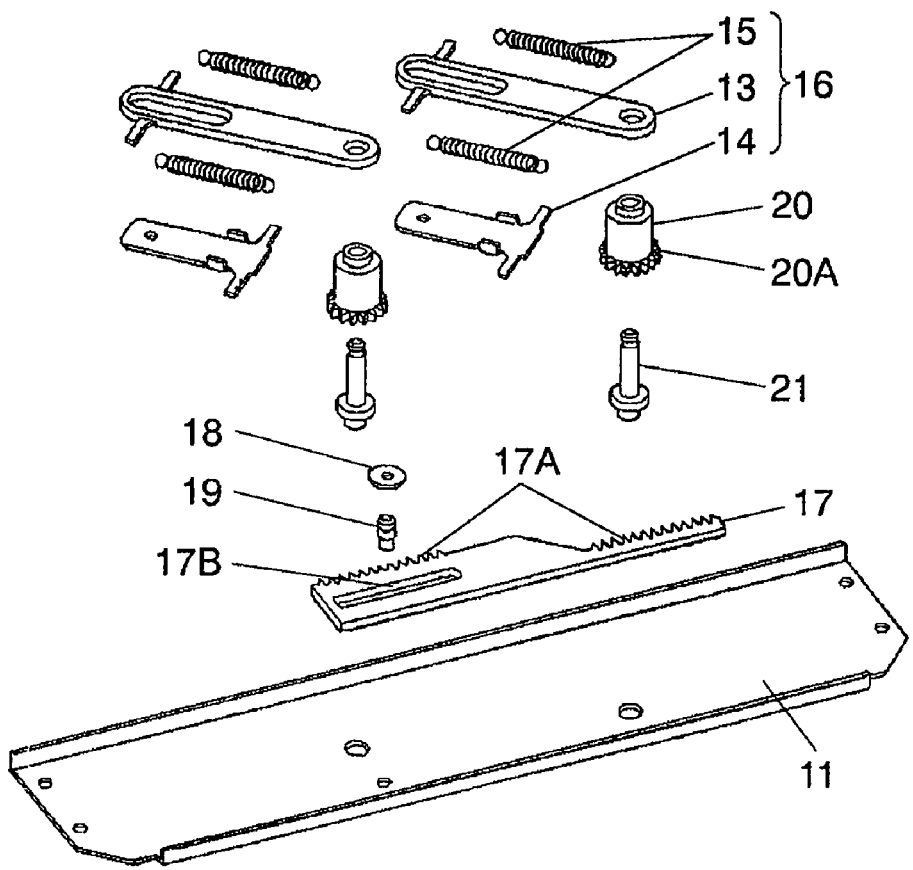

FIG. 1 is a plan view of an opening and closing device in the first exemplary embodiment of the present invention. FIG. 2 is an exploded perspective view of the opening and closing device in the first exemplary embodiment of the present invention. In FIGS. 1 and 2, fixed plate 11 is made of a sheet of metal, such as steel and copper alloy, or insulating resin. Movable plate 12 is disposed on a top face of fixed plate 11 in a movable manner in an up-and-down direction and a right-and-left direction orthogonal to the up-and-down direction. Movable plate 12 has two L-shaped guide holes 12A.

Upper frame 13 and lower frame 14 are made of a metal sheet or insulating resin. Spring 15 is made of a coiled steel wire or copper-alloy wire. On arms protruding from both side faces of upper frame 13 and lower frame 14, two slightly stretched springs 15 are hooked so that upper frame 13 and lower frame 14 pull each other to form spring member 16. In total, two spring members 16 are formed.

Rectangular movable gear 17 made of metal or insulating resin has two gear teeth portions 17A on its side face. A top end of pin 19 is fixed to ring 18, and a bottom end of pin 19 is secured to fixed plate 11. This pin 19 passes through long hole 17B so that movable gear 17 is attached to fixed plate 11 in an up-and-down movable manner.

Upper ends of two hollow fixed gears 20 made of metal or insulating resin are secured to right ends of upper frames 13 in spring members 16. Gear teeth portion 20A is formed around a periphery at a lower end of each of fixed gears 20. These gear teeth portions 20A engage with gear teeth portions 17A of movable gear 17, respectively.

Lower ends of rivets 21 are secured to fixed plate 11. These rivets 21 pass through hollow portions of fixed gears 20, and their upper ends are fixed to washers 22 and rings 23. By inserting lower ends of washers 22 into guide holes 12A in movable plate 12, the right ends of two spring members 16 secured to fixed gears 20 are installed in two guide holes 12A, respectively.

Rivets 24 pass through holes in movable plate 12, and long holes at the left ends of upper frames 13. Lower ends of rivets 24 are then fixed to the left ends of lower frames 14 so that the left ends of two spring members 16 are rotatably attached to movable plate 12, respectively.

Figure 3A:
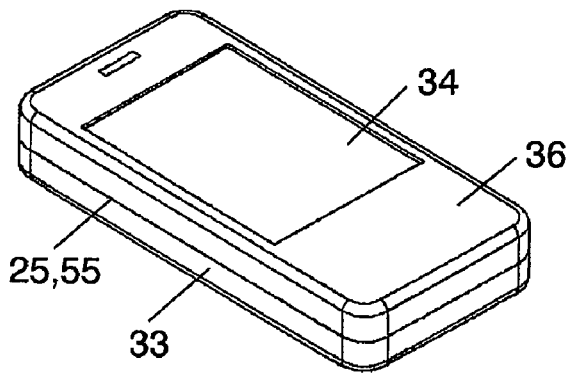
FIG. 3A is a perspective view of a mobile phone equipped with the opening and closing device in accordance with the first exemplary embodiment of the present invention.
Figure 3B:
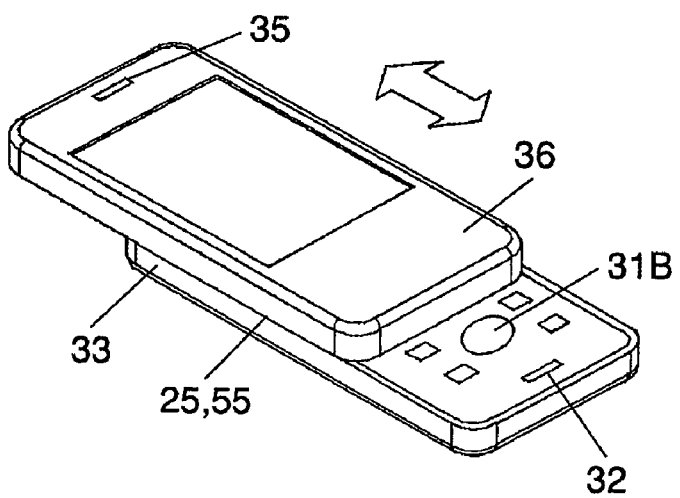
FIG. 3B is a perspective view of the mobile phone equipped with the opening and closing device in accordance with the first exemplary embodiment of the present invention.
Figure 3C:
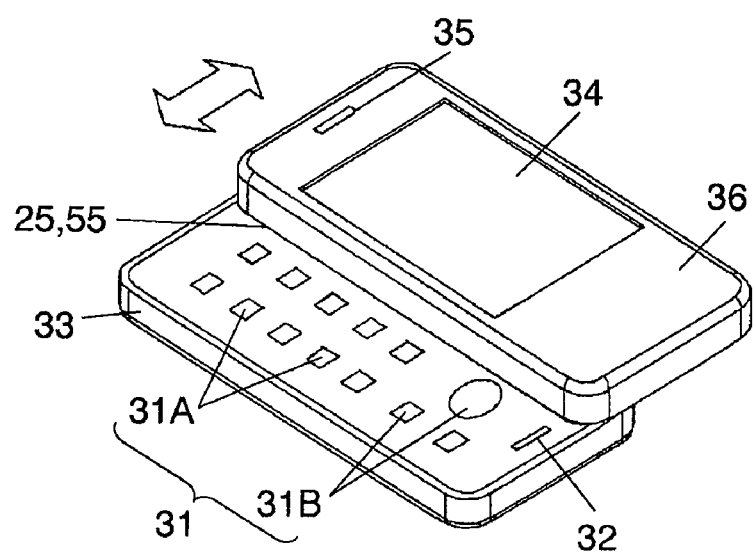
FIG. 3C is perspective view of the mobile phone equipped with the opening and closing device in accordance with the first exemplary embodiment of the present invention.

FIGS. 3A, 3B, and 3C are perspective views of a mobile phone equipped with the opening and closing device in the first exemplary embodiment of the present invention. In FIGS. 3A, 3B, and 3C, multiple operation keys 31A and input keys 31B for inputting numbers and characters are provided on the top face of operating part 31. Sound input part 32 such as a microphone is formed on fixed housing 33. Display 34, such as a liquid crystal display elements, and sound output part 35, such as a speaker, are formed on movable housing 36.

Fixed plate 11 is attached to operating part 31 and fixed housing 33. Movable plate 12 is attached to movable housing 36. Opening and closing device 25 retains movable housing 36 in an up-and-down movable manner and a right-and-left movable manner relative to fixed housing 33.

In the above structure, FIG. 3A illustrates a state that the right ends of two spring members 16 secured to fixed gears 20 is located at the top right ends of two guide holes 12A, respectively, so that fixed plate 11 and movable plate 12 are overlaid. More specifically, movable housing 36, to which movable plate 12 is attached, is retained in a closed state relative to fixed housing 33. In this state, a user can watch a TV program received on display 34, or confirm a caller indicated on display 34 when receiving a call.

Figure 4:
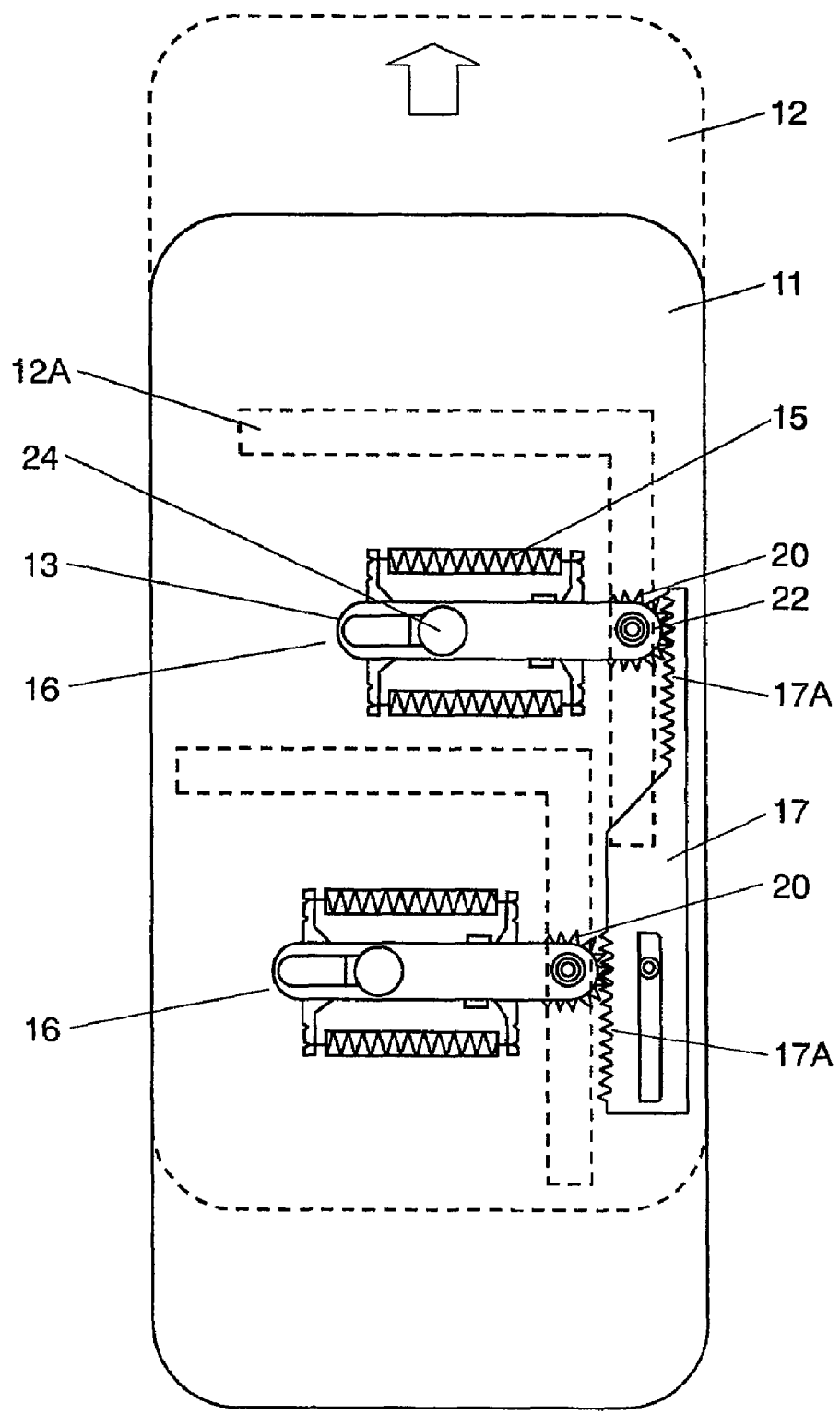
FIG. 4 is a plan view of a mobile phone equipped with the opening and closing device, when sliding a part of the mobile phone, in accordance with the first exemplary embodiment of the present invention.

FIG. 4 is a plan view of the mobile phone equipped with the opening and closing device in the first exemplary embodiment when the user slides the mobile phone. In FIG. 4, as the user moves movable housing 36 upward by hand from the closed state shown in FIG. 3A, movable plate 12 moves upward, and rivet 24 also moves upward. Accordingly, upper frame 13 moves leftward as it stretches springs 15 provided on its both side faces. Movable gear 17, whose gear teeth portions 17A are engaged with fixed gears 20 at the right ends of spring members 16, moves downward.

Figure 5:
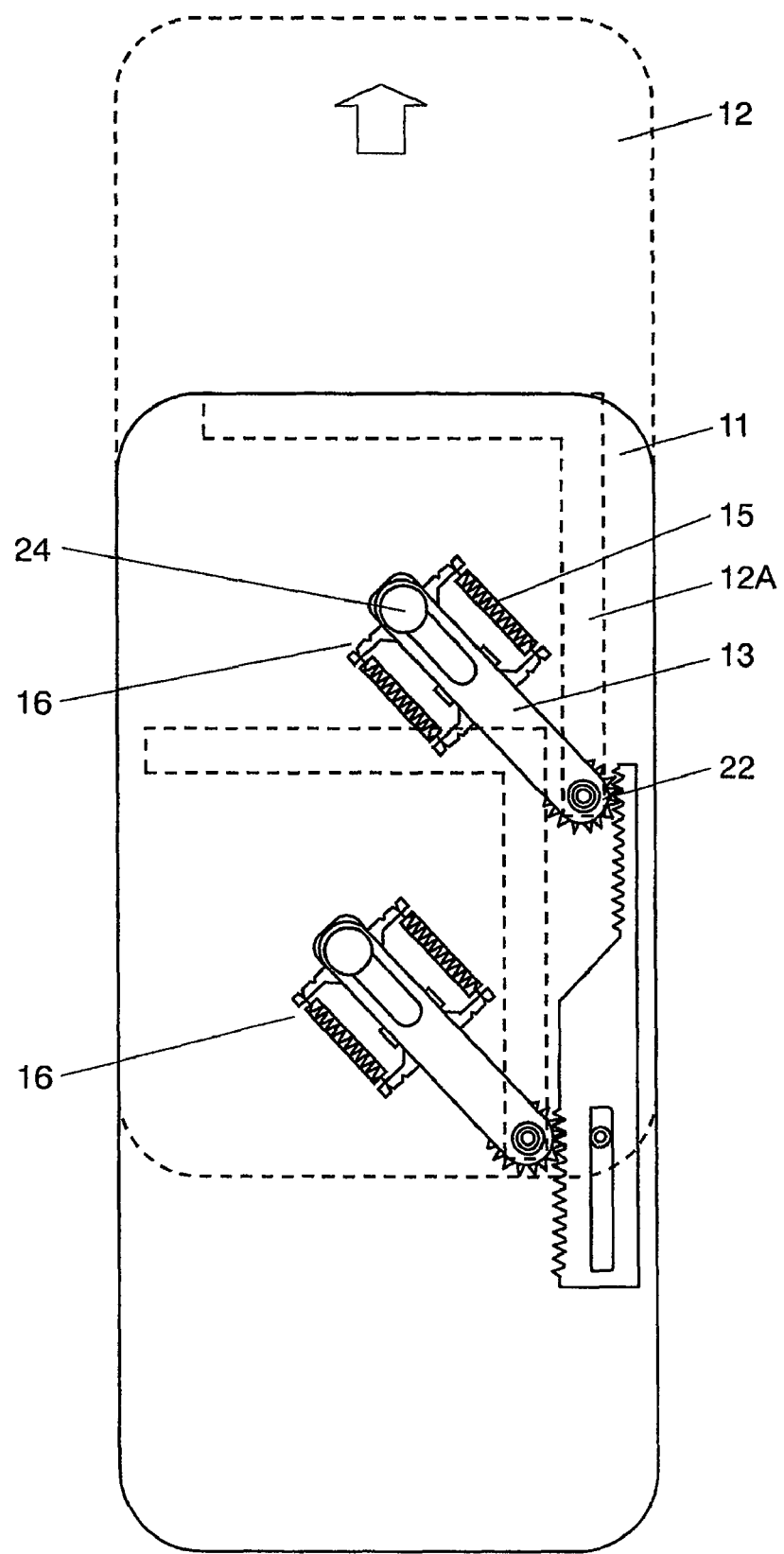
FIG. 5 is a plan view of the mobile phone equipped with the opening and closing device, when sliding a part of the mobile phone, in accordance with the first exemplary embodiment of the present invention.

FIG. 5 is a plan view of the mobile phone equipped with the opening and closing device in the first exemplary embodiment of the present invention when the user slides the mobile phone. In FIG. 5, movable plate 12 is further moved upward from the position shown in FIG. 4. Now, upper frame 13 moves toward the bottom right by the tensile force of spring 15. Spring member 16 applies an upward force to rivet 24 and in turn applies the upward force to movable plate 12 attached to rivet 24. Accordingly, a force to open upward is applied to movable housing 36.

Then, as shown in FIG. 3B, movable housing 36 is retained open upward relative to fixed housing 33 so that sound input part 32 and input keys 31B are uncovered. Sound input part 32 and sound output part 35 can be retained at positions of mouth and ear for comfortable telephone conversation. Here, the upward movement of movable plate 12 given force by spring members 16 is guided by the right ends of two spring members 16 installed in two vertical guide holes 12A via washers 22. This ensures reliable opening and closing operations without wobbling and looseness during movement.

Figure 6:
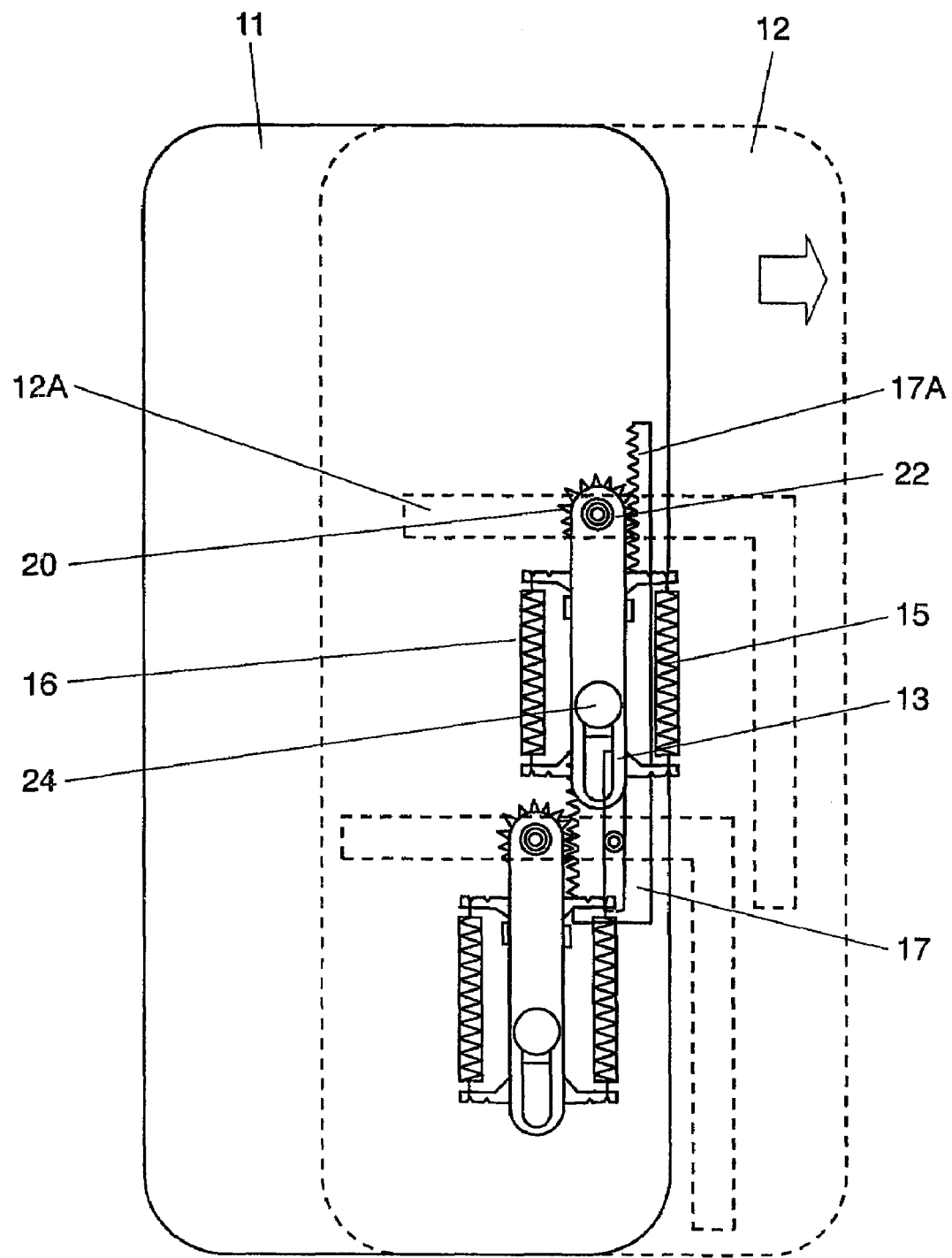
FIG. 6 is a plan view of a mobile phone equipped with the opening and closing device, when sliding a part of the mobile phone, in accordance with the first exemplary embodiment of the present invention.

FIG. 6 is a plan view of the mobile phone equipped with the opening and closing device in the first exemplary embodiment of the present invention when the user slides the mobile phone. In FIG. 6, when movable housing 36 is moved rightward by hand from the closed state shown in FIG. 1, movable plate 12 moves rightward, and rivet 24 also moves rightward. Accordingly, upper frame 13 moves downward while stretching springs 15 attached to its both side faces. Then, movable gear portion 17, whose gear teeth portion 17A is engaged with fixed gear 20 at the upper end of spring member 16, moves upward.

Figure 7:
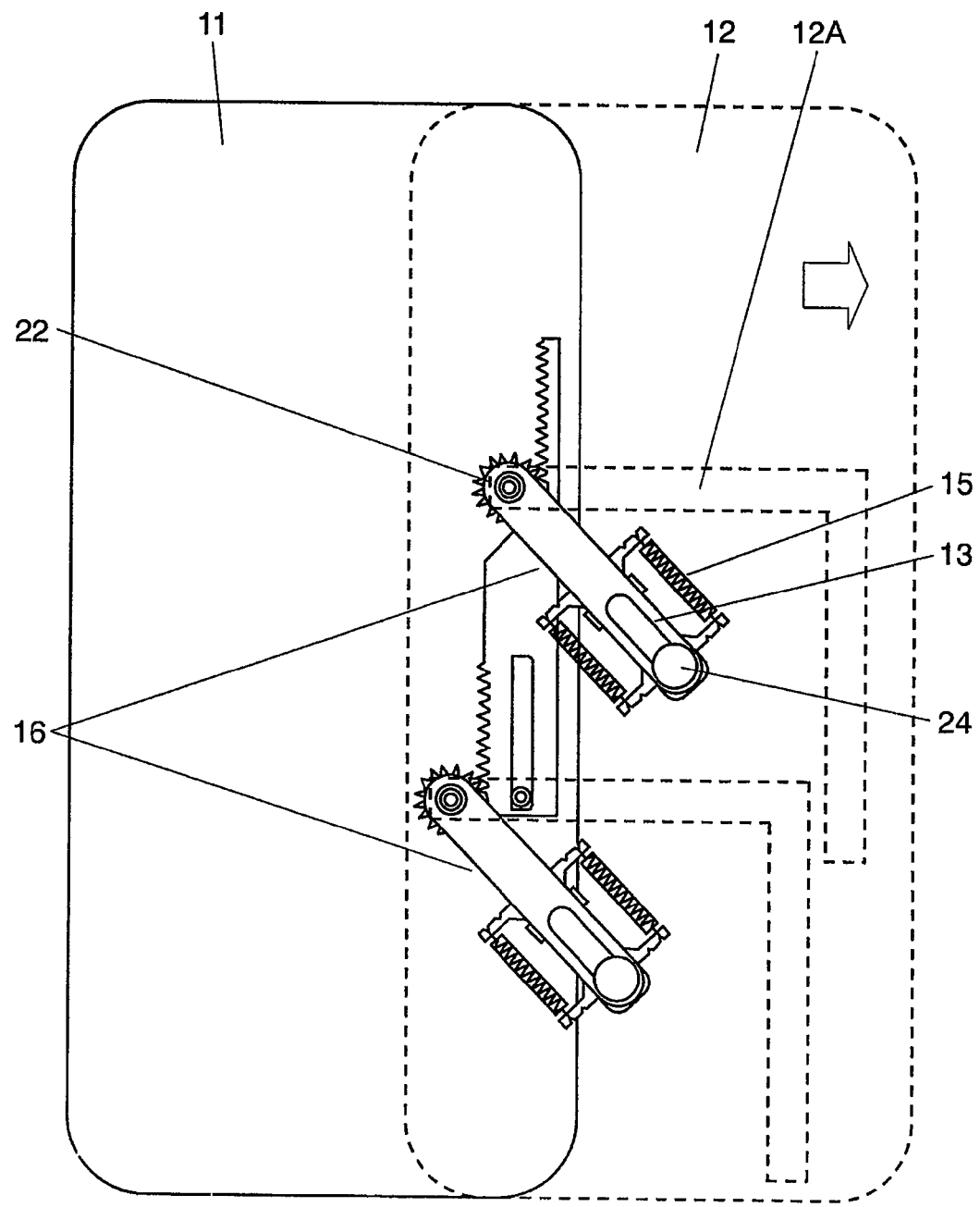
FIG. 7 is a plan view of the mobile phone equipped with the opening and closing device, when sliding a part of the mobile phone, in accordance with the first exemplary embodiment of the present invention.

FIG. 7 is a plan view of the mobile phone equipped with the opening and closing device in the first exemplary embodiment of the present invention when the user slides the mobile phone. In FIG. 7, when movable plate 12 is further moved rightward from the position shown in FIG. 6, upper frame 13 moves toward the top left by the tensile force of springs 15. Then, spring member 16 applies a rightward force to rivet 24 and in turn applies the rightward force to movable plate 12 attached to rivet 24. Accordingly, a force to open rightward is applied to movable housing 36.

Then, as shown in FIG. 3C, movable housing 36 is retained open rightward relative to fixed housing 33 so that operating part 31, including operation keys 31A and input keys 31B, is uncovered. This is the state easy for the user to input characters and numbers to a mail and function setting by using operating part 31 while looking at display 34. Also in this rightward opening and closing operation, the rightward movement of movable plate 12 given force by spring member 16 is guided by the upper ends of two spring members 16 installed in two horizontal guide holes 12A via washers 22. This ensures reliable opening and closing operations without wobbling and looseness during movement.

In the opening and closing device in the first exemplary embodiment of the present invention, as described above, fixed gear 20 engaged with movable gear 17 is attached to the right end of spring member 16 applying force to movable plate 12. In addition, L-shaped guide hole 12A is created in movable plate 12, and the right end of spring member 16, whose left end is attached to movable plate 12, is installed in guide hole 12A. This enables movable plate 12 to move in multiple directions including the upward direction and the rightward direction orthogonal to the upward direction relative to fixed plate 11. In other words, the upward or rightward movement of movable plate 12 causes downward or upward movement of movable gear 17. At the same time, spring member 16, whose right end is installed in L-shaped guide hole 12A, applies the upward or rightward force to movable plate 12. Accordingly, single opening and closing device 25 achieves combined operations in two orthogonal directions.

The first exemplary embodiment of the present invention thus offers opening and closing device 25 with a simple structure that allows diversifying operations. Provision of multiple spring members 16 and multiple guide holes 12A also prevent wobbling in movement of movable plate 12 in the up-and-down and right-and-left directions, ensuring reliable operations.

Second Exemplary Embodiment

Figure 8:
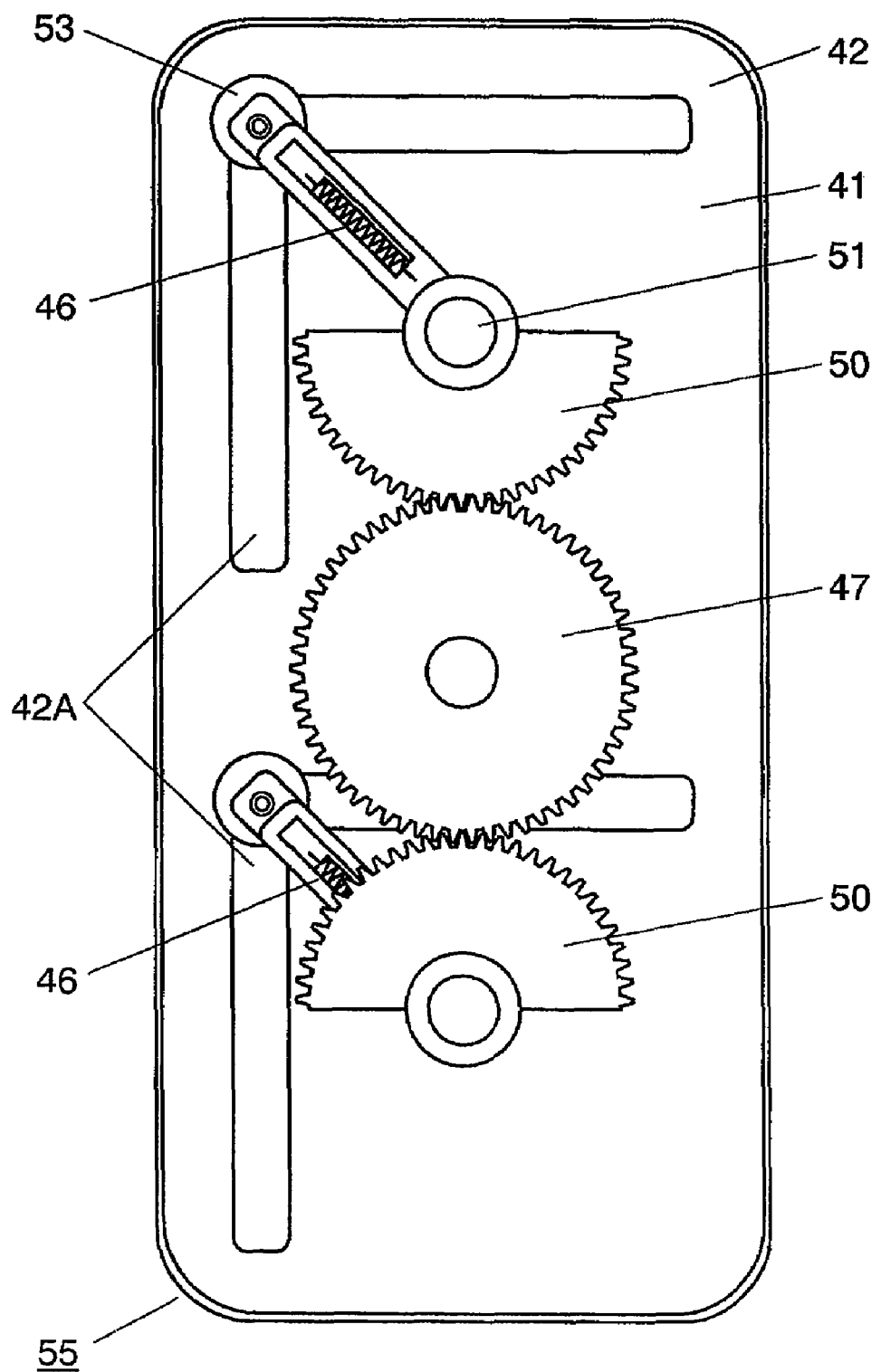
FIG. 8 is a plan view of an opening and closing device in accordance with a second exemplary embodiment of the present invention.
Figure 9:
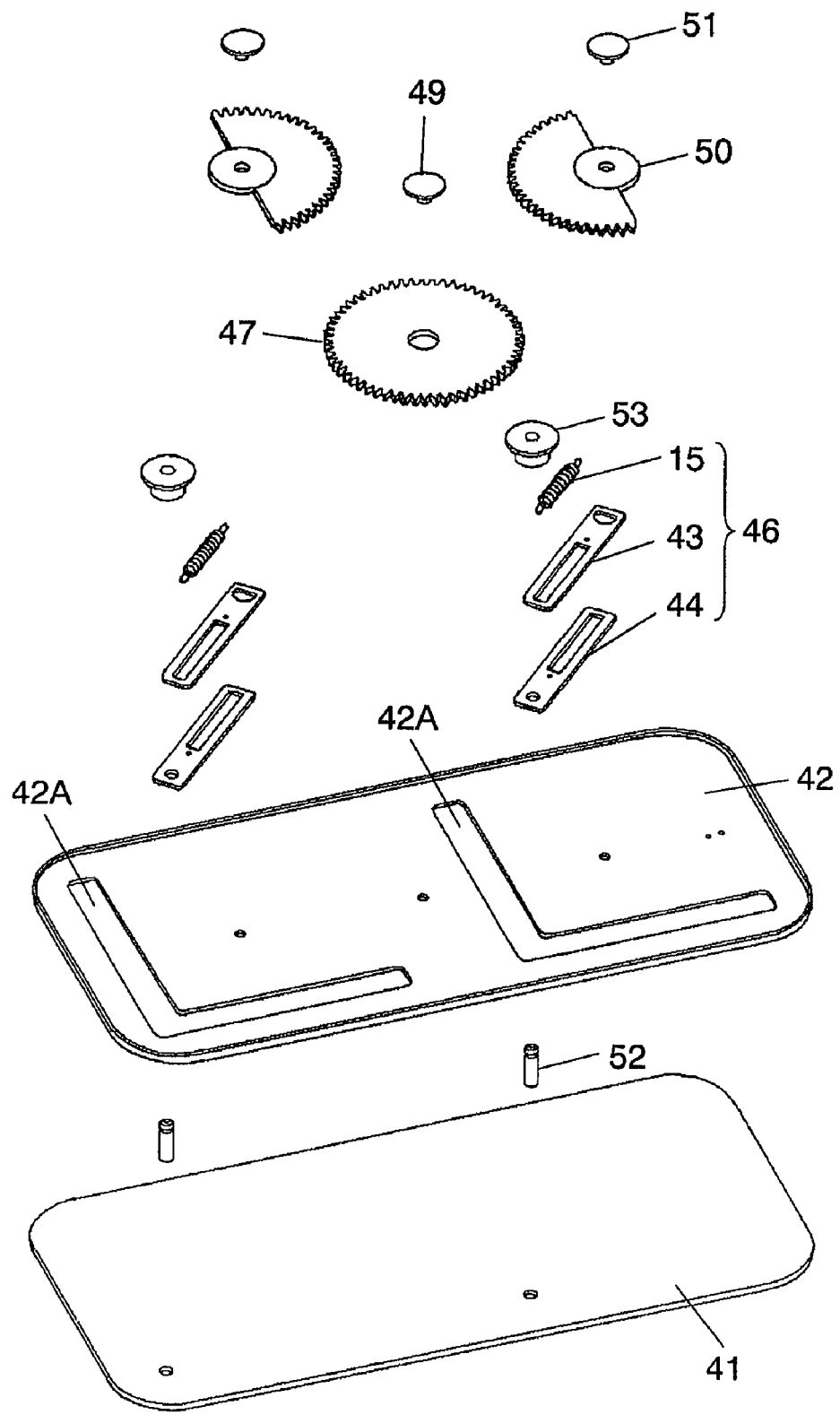
FIG. 9 is an exploded perspective view of the opening and closing device in accordance with the second exemplary embodiment of the present invention.
Figure 10A:
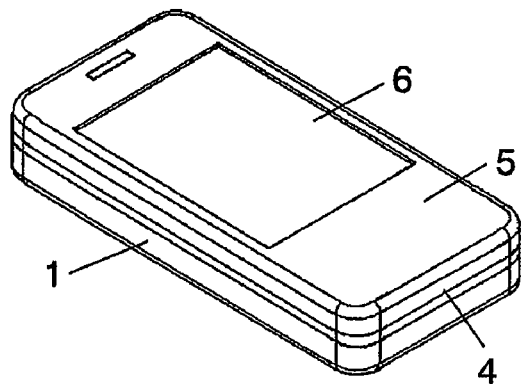
FIG. 10A is a perspective view of a conventional mobile phone.
Figure 10B:
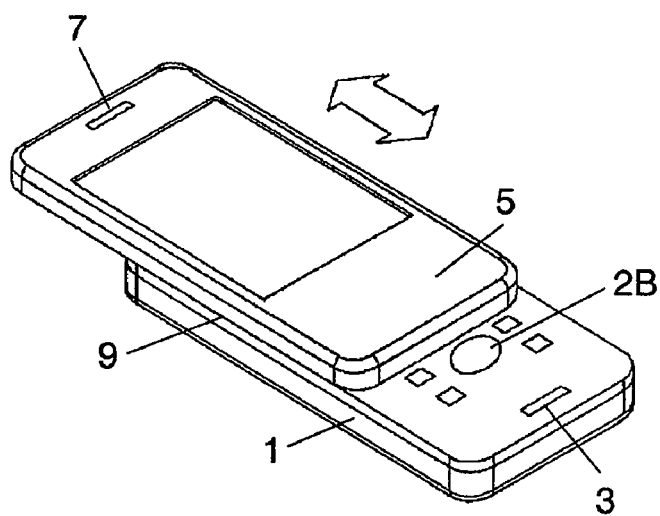
FIG. 10B is a perspective view of the conventional mobile phone.
Figure 10C:
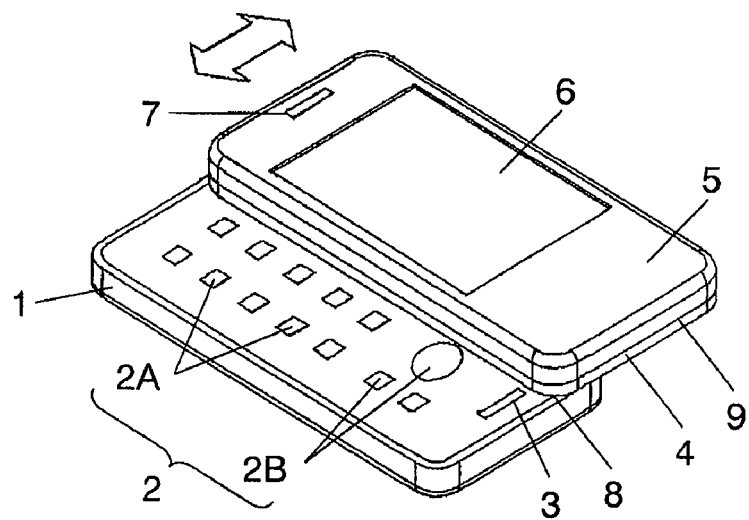
FIG. 10C is a perspective view of the conventional mobile phone.

FIG. 8 is a plan view of an opening and closing device in accordance with the second exemplary embodiment of the present invention. FIG. 9 is an exploded perspective view of the opening and closing device in the second exemplary embodiment of the present invention. The same reference names and marks are given to components same as that of the first exemplary embodiment to omit duplicate detailed description. In FIGS. 8 and 9, movable plate 42 is disposed on the top face of fixed plate 41 in a movable manner in an up-and-down direction and a right-and-left direction orthogonal to the up-and-down direction. Movable plate 42 has two L-shaped guide holes 42A. Plate-like upper frames 43 and lower frames 44 configure two spring members 46, respectively. In the second exemplary embodiment of the present invention, one spring 15 is fitted to a long hole in upper frame 43 and lower frame 144, and this slightly-stretched spring 15 establishes the state that upper frame 43 and lower frame 144 pull each other.

Movable gear 47 is not rectangular but round, and a gear teeth portion is provided on its periphery. This movable gear 47 is rotatably attached to movable plate 42 by rivet 49.

Semi-circular fixed gear, whose gear teeth portion is provided on its periphery, is secured to the right end of spring member 46, and engages with movable gear 47. This right end of spring member 46 is rotatably attached to movable plate 42 by rivet 51.

Pin 52, whose lower end is secured to fixed plate 41, passes through a hole at a lower end of lower frame 44 in spring member 46, and its upper end is secured by rivet 53. A lower end of this rivet 53 is inserted into guide hole 42A in movable plate 42. This makes the left ends of two spring members 46 installed in two guide holes 42A, respectively.

Movable gear 47 is rotatably attached to movable plate 42. Fixed gear engaged with this movable gear 47 is secured to the right end of spring member 46. This right end is attached to movable plate 42. The left end of spring member 46 is installed in guide hole 42A, and secured to fixed plate 41 by pin 52.

Using this opening and closing device 55 as configured above, fixed plate 41 is attached to fixed housing 33, and movable plate 42 is attached to movable housing 36. Movable housing 36 is movably retained in the up-and-down direction and the right-and-left direction relative to fixed housing 33.

In the above structure, movable housing 36, to which movable plate 42 is attached, is moved upward by hand from the closed state relative to fixed housing 33, as shown in FIG. 8. This operation makes movable plate 42 move upward, and rivet 51 also moves upward. Accordingly, movable gear 47, engaged with fixed gear 50 at the right end of spring member 46, rotates. After movable plate 42 moves for a predetermined distance, spring member 46, whose left end is fixed to fixed plate 41, applies an upward force to movable plate 42. Accordingly, movable housing 36 is retained open upward.

When movable housing 36 is moved leftward from the closed state shown in FIG. 8, movable plate 42 moves leftward, making movable gear 47 rotate. After movable plate 42 moves for a predetermined distance, spring member 46 applies a leftward force to movable plate 42. Accordingly, movable housing 36 is retained open leftward.

In the upward and leftward opening and closing operations, as described above, movable plate 42 receiving the force of spring member 46 moves in a way such that movable plate 42 is guided by the left ends of two spring members 46 installed in two guide holes 42A in vertical or horizontal direction via rivet 53. This ensures reliable opening and closing operations without wobbling or looseness during movement.

In the opening and closing device in the second exemplary embodiment of the present invention, fixed gear 50 engaged with movable gear 47 is secured to the right end of spring member 46 applying force to movable plate 42. In addition, L-shaped guide hole 42A is created in movable plate 42, and the left end of spring member 46, whose right end is attached to movable plate 42, is installed in guide hole 42A. This enables movable plate 42 to move in multiple directions including the upward direction and the leftward direction orthogonal to the upward direction. In other words, movable gear 47 rotates as movable plate 42 moves upward or leftward. At the same time, spring member 46, whose left end is installed in L-shaped guide hole 42 and secured to fixed plate 41 by pin 52, applies the upward or rightward force to movable plate 42. Accordingly, single opening and closing device 55 achieves combined operations in two orthogonal directions.

The second exemplary embodiment of the present invention thus offers the opening and closing device with a simple structure that allows diversifying operations f. Provision of multiple spring members 46 and multiple guide holes 42A also prevent wobbling in movement of movable plate 42 in the up-and-down and right-and-left directions, ensuring reliable operations.

The exemplary embodiments refer to spring members 16 and 46 using a coiled spring, a so-called tension coil spring. However, a so-called compression coil spring is also applicable. Still more, other coil springs including U-shaped bent plate springs and wire springs are also applicable to the present invention.

The above description refers to the movement of moving movable plate 12 or 42 in the upward direction or in the left or right direction relative to fixed plates 11 and 41. However, the present invention offers movement in any up-and-down direction and right-and-left direction orthogonal to the up-and-down direction by changing directions of L-shaped guide holes 12A and 42A.

The opening and closing device of the present invention allows diversifying operations using a simple structure, and thus it is effectively applicable to the opening and closing device of a range of electronic devices.

What is claimed is:

1. An opening and closing device comprising:
a plate-like fixed member;
a movable member movably disposed on a top face of the fixed member;
a plurality of spring members applying a force to the movable member in a moving direction;
a movable gear attached to one of the fixed member and the movable member in one of a movable manner and a rotatable manner; and
a fixed gear secured to one end of each spring member, the fixed gear being engaged with the movable gear;
wherein
a plurality of L-shaped guide holes are created in the movable member, one end of each spring member being installed in a respective guide hole, and an other end of each spring member being attached to the movable member,
the movable member is movable in a first linear direction relative to the fixed member, and
the movable member is movable in a second linear direction relative to the fixed member, the second linear direction not parallel to the first linear direction.

* * * * *